United States Patent [19]

Kihara et al.

[11] Patent Number: 5,059,388
[45] Date of Patent: Oct. 22, 1991

[54] PROCESS FOR MANUFACTURING SINTERED BODIES

[75] Inventors: Hiroshi Kihara; Eiki Arai, both of Narashino; Shigeaki Ogata, Nagareyama; Yoshio Katagiri; Katsuyuki Fujita, both of Tokyo; Tadahiko Wachigai; Hiroyoshi Hiratsuka, both of Sendai, all of Japan

[73] Assignees: Sumitomo Cement Co., Ltd.; Seiko Instruments Inc., both of Tokyo; Seiko Electronic Components Ltd., Sendai, all of Japan

[21] Appl. No.: 417,198

[22] Filed: Oct. 4, 1989

[30] Foreign Application Priority Data

Oct. 6, 1988 [JP] Japan ................. 63-252672
Jan. 5, 1989 [JP] Japan ................. 64-610
Jan. 5, 1989 [JP] Japan ................. 64-611
May 22, 1989 [JP] Japan ................. 1-128261

[51] Int. Cl.$^5$ ............................ C04B 38/04
[52] U.S. Cl. ........................ 419/37; 264/63; 264/344; 419/36
[58] Field of Search ............... 264/63, 344; 419/36, 419/37

[56] References Cited

U.S. PATENT DOCUMENTS

| | | | |
|---|---|---|---|
| 2,939,199 | 6/1960 | Strivens | 264/101 |
| 4,113,480 | 9/1978 | Rivers | 75/214 |
| 4,404,166 | 9/1983 | Wiech, Jr. | 419/36 |
| 4,721,599 | 1/1988 | Nakamura | 419/23 |
| 4,765,950 | 8/1988 | Johnson | 419/2 |
| 4,820,462 | 4/1989 | Nakajima et al. | 264/63 |

FOREIGN PATENT DOCUMENTS 615429 2/1961 Canada ........................ 264/63

OTHER PUBLICATIONS

Levine, Temporary Organic Binders for Ceramic Systems, Ceramic Age, Feb. 1960, pp. 25-27, 32, 33, 34.
Pett et al., "Extrusion of Thin-Walled B"-Aluminn Tubes, Ceramic Bulletin, vol. 61, No. 9 (1982), pp. 992-995.
Schuetz, "Methylcellulose Polymers as Binders for Extrustion of Ceramics," Ceramic Bulletin, vol. 65, No. 12 (1986), pp. 1556-1559.

Primary Examiner—James Derrington
Attorney, Agent, or Firm—Varndell Legal Group

[57] ABSTRACT

Using an organic binder containing at least one water-soluble thermoplastic organic polymer and at least one water-insoluble thermoplastic organic polymer, the water-soluble thermoplastic organic polymer is extracted by debinding treatment in which a plastic molded part such as injection molded part and water are brought into contact with each other to prevent the occurrence of cracks in the molded part. Removal by extraction of the water-soluble thermoplastic polymer reduces the amount of the organic binder contained in the molded part sufficiently, thus preventing the softening and deformation of the molded part at the time of optionally heating and removing the remainder of the organic binder and/or sintering of the molded part and also preventing the occurrence of swelling and cracks by the effect of guide passage formed by the extraction of the organic polymer. Thermal debinding prior to sintering can be eliminated when polyethylene oxide is used as the water-soluble binder, which enables considerable reduction in the time required for debinding.

26 Claims, 7 Drawing Sheets

PROCESS FOR MANUFACTURING SINTERED BODIES

BACKGROUND OF THE INVENTION

The present invention relates to a process for manufacturing sintered bodies by molding powders of metals, ceramics or the like utilizing a plastic molding process. More particularly, it relates to the composition of plastic molded parts such as injection molded parts and to a process for debinding the plastic molded parts.

Heretofore, there has been known a process for manufacturing sintered bodies, in which metal powders or ceramics powders are blended with an organic binder, and the mixture is kneaded to impart the powders with sufficient flowability, then the mixture is molded by plastic molding such as a injection molding process to form a molded part or compact, and the compact is debinded(debind: removing binder from a molded part) and sintered. The term "plastic molding" as used herein refers to injection molding, transfer molding and hot extrusion molding. In this case, examples of the debinding process include (a) a process for heating the plastic molded part to decompose and vaporize the organic binder, and (b) a process for extracting the organic binder from the plastic molded part using a solvent.

The process (a) has a defect that it takes a very long time for the molded part to be debinded without causing its deformation. More particularly, plastic molding processes generally make use of the phenomenon that the kneaded mixture composed of the powder and the organic binder softens and become flowable when it is heated, and one can naturally expect that the molded part softens and deforms upon heating. It might be a solution to prevent this defect to remove a portion of the organic binder contained in the kneaded mixture before the temperature reaches the temperature at which the molded part begins to undergo deformation (hereafter, sometimes referred to as "deformation temperature"). In this case, however, it takes a long time to obtain desired effects if the organic binder is removed by decomposing or vaporizing it at temperatures below its deformation temperature. On the contrary, if the organic binder decomposes or vaporizes readily at temperature below its deformation temperature, the flowability of the kneaded mixture upon the plastic molding is unstable and in addition the recycle of the runners and sprues after the plastic molding is impracticable.

Another process in which the deformation of the molded part is prevented by controlling the degree of its softening at the time of debinding results in that the flowability of the kneaded mixture upon plastic molding is deteriorated, which makes molding with high precision difficult. On the other hand, processes in which thermosetting resins are used as the organic binder or sublimable substances are added in order to prevent the deformation of the molded part upon debinding cause problems that the flowability of the kneaded mixture is deteriorated and that the recycle of the runners and sprues is impossible. Further problem involved in the process (a) above is that swelling or cracks occurs in the plastic molded part due to abrupt decomposition or vaporization of the organic binder in the initial stage of debinding when the rate of the debinding is raised.

Accordingly, when a portion of the organic binder is removed by extracting it with a solvent at temperature below the deformation temperature of the molded part according to the process (b) above in order to solve this problem, and the space formed in the molded part by the removal of the organic binder serves as a guide passage for decomposition gases, which enables the gases generated by the decomposition or vaporization of the remainder of the organic binder to be readily discharged, thus avoiding the occurrence of deformation upon subsequent heating resulting in that swelling or cracks of the plastic molded part hardly occurs. As in the case of (a), recycle of the runners and sprues is possible since there is no need to employ thermally unstable components.

However, in the process (b) above, in order to extract those organic binders which have been generally used in powder plastic molding processes, it has heretofore been necessary to use organic solvents such as the hydrocarbon or the halogenated hydrocarbon which are in most case harmful to humans. For this reason, a special installment is needed in order not to discharge vapor of the organic solvent and the like out of the system and to prevent humans from being brought in direct contact with the organic solvent. Furthermore, the manufacuture cost increases since organic solvents are generally expensive. Also, full care must be taken for the administration of the organic solvents since there is a danger that they readily catch fire if they are carelessly or wrongly treated with.

Also, a process in which debinding by heating is conducted after extracting, among the organic binder, only plasticizers and lubricants might be usable. In this case, however, it is impossible to increase the amount of the plasticizer or lubricant to be added to the kneaded mixture more than ever since the strength of the molded part is deteriorated or poor molding such as bleeding occurs upon the plastic molding with increased amount of the plasticizer or lubricant. Therefore, this process has been felt unsatisfactory in order to prevent the deformation or swelling of the molded part at the time of debinding by heating.

SUMMARY OF THE INVENTION

The present invention has been completed with view to obviating the above-described defects of the conventional processes, and is intended to enable debinding in a shorter period of time without causing deformation, swelling or cracks in the step of debinding of the plastic molded parts such as injection molded parts obtained by the powder plastic molding process.

According to the present invention, the above object is solved by a process for manufacturing a sintered body comprising mixing a powder and an organic binder which comprises at least one water-soluble thermoplastic organic polymer and at least one water-insoluble thermoplastic organic polymer to form a mixture, plastic molding the mixture to obtain an plastic molded part, and debinding said plastic molded part by bringing it in contact with water to extract and remove said water-soluble thermoplastic organic polymer, and sintering the plastic molded part after said debinding.

In a further aspect, this invention also provides a process for manufacturing a sintered body as described above, which further comprises removing the remainder of the organic binder by heating it in a heating furnace for sintering in the atmosphere of the atmospheric pressure or redused pressure after said bringing in contact with water of said water-soluble thermoplastic organic polymer.

BRIEF DESCRIPTION OF THE DRAWINGS

FIGS. 1 and 2 relate to the analyses which have led to the process of the present invention in which:

FIG. 1 is a graph plotting the relationship between the time and degree of extraction when molded parts having different sizes are extracted; and FIG. 2 is a graph indicating the distribution of concentration of extracted water-soluble polymer at the outside of the molded parts at the point in time where the rate of extraction has become small;

FIGS. 3 through 7 relates to the present invention in which:

FIG. 3 is a schematical view illustrating the construction of the apparatus for practicing the process of this invention;

FIG. 4 is a graph showing the relationship between the extraction time and the degree of extraction when debinding is conducted using the apparatus shown in FIG. 3;

FIG. 5 is a schematical view illustrating the construction of the apparatus for practicing the process of this invention;

FIG. 6 is a schematical view illustrating the construction of the apparatus practicing the process of this invention;

FIG. 7 is a graph showing the relationship between the extraction time and the degree of extraction when debinding is conducted using the apparatus shown in FIG. 6;

FIGS. 8 through 13 relates to the present invention in which;

FIG. 8 is a schematical view illustrating the construction of the apparatus for practicing the process of this invention;

FIG. 9 is a graph plotting the relationship between the extraction time and the concentration of the water-soluble polymer in the discharged water when debinding is conducted using the apparatus shown in FIG. 8;

FIG. 10 is a graph plotting the relationship between the extraction time and the degree of extraction when debinding is conducted using the apparatus shown in FIG. 8;

FIG. 11 is a schematical view illustrating the construction of the apparatus for practicing the process of this invention;

FIG. 12 is a schematical view illustrating the construction of the apparatus practicing the process of this invention;

FIG. 13 is a graph showing the relationship between the extraction time and the degree of extraction when debinding is conducted using the apparatus shown in FIG. 12;

FIGS. 14 through 16 relate to the process of the present invention in which:

FIG. 14 is a graph plotting the relationship between the time of dipping in water and the degree of extraction in Example 1;

FIG. 15 is a side view of the molded particle illustrating the position thereof after dipping in water and extraction; and FIG. 16 is a graph plotting the time of dipping in water and the degree of extraction of the binder.

DETAILED DESCRIPTION OF THE INVENTION

Figure 1:
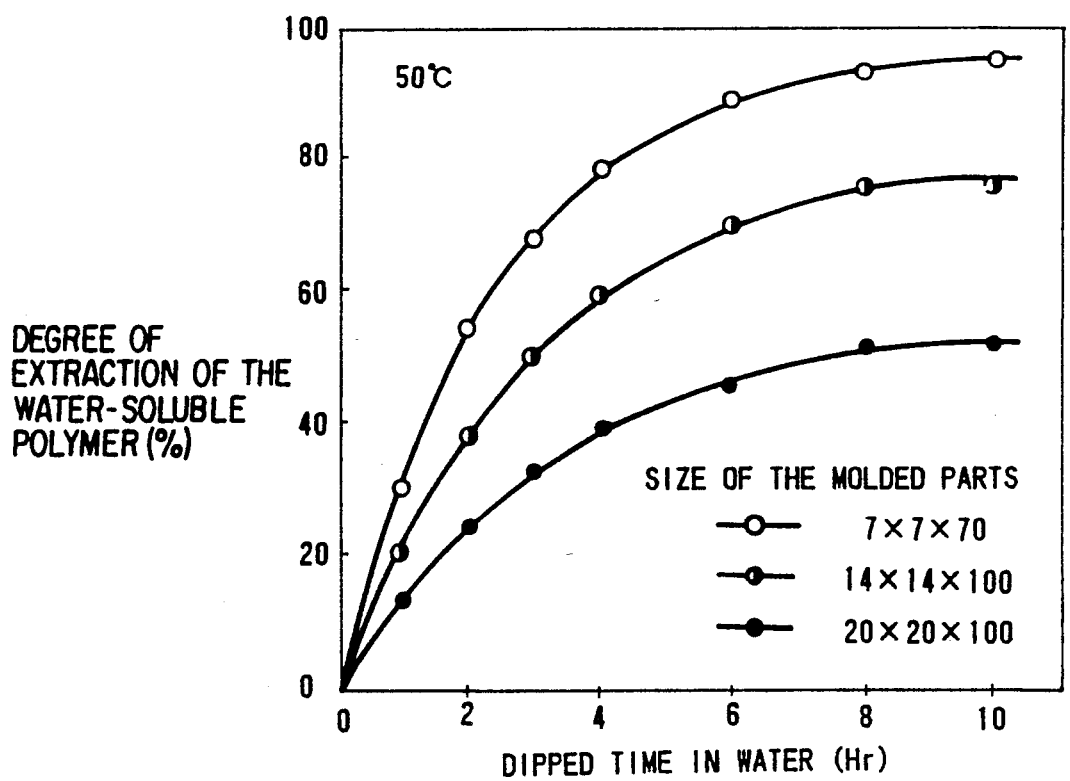

Referring to the injection molding as an example, the present invention will be explained in detail hereinbelow.

At first, the powder and the organic binder are mixed and the resulting mixture is plastic molded to obtain a plastic molded part or compact. As the powder, there can be used metal powder, ceramics powder and the like. The organic binder which can be used includes an organic binder containing at least one water-soluble thermoplastic organic polymer and at least one water-insoluble thermoplastic organic polymer. As for the water-soluble thermoplastic organic polymer, there can be used suitably polyethylene oxide, polyethylene glycol, methylcellulose, carboxymethylcellulose, polyacrylamide, polyvinyl ether, polyacrylic acid, polymethacrylic acid and the like. Among these, polyethylene oxide is used preferably. That is, polyethylene oxide is excellent in plastic moldability, has good compatibility not only with other water-soluble polymers but also with water-insoluble thermoplastic polymer, for example, polystyrene, polyethylene, polymethacrylic acid esters, ethylene/vinyl acetate copolymers or the like, and exhibit good thermal decomposition property. As for the above-described water-insoluble thermoplastic organic polymer, there can be used those thermoplastic polymers which can be used in the conventional plastic molding processes for metal powders or ceramics powders such as polystyrene, polyethylene, polymethacrylic acid esters, ethylene/vinyl acetate copolymers referred to above. Among them, one containing at least one of polystyrene, polyethylene, atactic polypropylene, and ethylene/vinyl acetate copolymers is preferred from the viewpoints of flowability of the kneaded mixture and the strength of the molded part.

The plastic molded part thus obtained is subjected to debinding treatment to convert it to a debinded body or compact. The debinding treatment is performed by at first bringing the plastic molded part into contact with water including water at room temperature and hot water to extract the water-soluble thermoplastic organic polymer. As for the method of bringing the plastic molded part into contact with water, it is preferred to dip the plastic molded part in water from the viewpoints of workability and shortening of the extraction time. It should be noted here that when polyethylene oxide is used in larger amounts as the water-soluble thermoplastic organic polymer as described hereinbelow, the subsequent sintering step can be carried out immediately without performing the thermal debinding step, with the result that the time required for the debinding can be shortened to a greater extent. Usually, the removal of the water-soluble thermoplastic organic polymer by extraction is followed by thermal debinding performed in a heating furnace to remove the remainder of the organic binder including the water-insoluble thermoplastic organic polymer. The thermal debinding can be conducted at atmospheric pressure. However, it is preferred to carry out the thermal debinding at reduced pressure since the time required for the removal of the organic binder can be shortened. Thermal debinding in vacuum is particularly preferred.

Thereafter, the debinded body is subjected to sintering treatment to obtain a sintered body composed of metals, ceramics or the like.

The present invention also gives a solution to the following problems. That is, when the combination of the solvent and the organic binder is improper, it is often the case that the organic binder swells upon extraction or it takes a long time for the organic binder to be extracted. Another problem is that in the case where liquid plasticizers, oils, relatively low molecular weight lubricants or plasticizers such as stearic acid or paraffin are selected as the organic binder to be extracted, the resulting molded part will be too soft or fragile to handle when the contents of these substances in the organic binder are large because these substances make the strengh of molded parts lower, resulting in that it is difficult to increase the amount of the organic binder to be added. On the contrary, when the amount of the solvent soluble organic binder is small, it takes a long time to remove the remainder of the organic binder which remains unextracted in the molded part, with the result that the effect of shortening the debinding time by means of extraction is reduced.

In order to solve these problems, the present invention also provides a process for manufacturing a sintered body comprising mixing a powder and an organic binder, plastic molding the mixture to obtain a molded part, and debinding and sintering the molded part, characterized in that as the organic binder is used an organic binder which comprises 60 to 90% by weight of polyethylene oxide, 5 to 38% by weight of a water-insoluble thermoplastic organic polymer, 2 to 35% by weight of a lubricant and/or a plasticizer, and as the debinding operation for debinding the molded parts, the plastic molded part is brought into contact with water to extract said polyethylene oxide therefrom, and thereafter the remainder of the organic binder is removed by heating it in a heating furnace.

The above-described process will be explained in detail hereinbelow.

At first, the powder and the organic binder are mixed as described above, and the mixture is plastic molded to obtain a molded part. As the binder, there is used one comprised of 60 to 90% by weight of polyethylene oxide, 5 to 38% by weight of a water-insoluble thermoplastic organic polymer, 2 to 35% by weight of a lubricant and/or a plasticizer. When the amount of the polyethylene oxide is not higher than 60% by weight, swelling, cracks or the like tend to occur in the sintered body obtained by sintering the molded part immediately after extracting the polyethylene oxide with water, and therefore a separate thermal debinding step is necessary. On the other hand, with the amount of the polyethylene oxide of not lower than 90% by weight or with the amount of the water-insoluble thermoplastic organic polymer of not higher than 5% by weight, the molded part tends to be disintegrated. In addition, with not higher than 2% by weight of the lubricant and/or plasticizer, the flowability of the kneaded mixture is insufficient, while separation of the binder from the powder occurs upon molding or the strength of the molded part decreases with not lower than 35% by weight of the lubricant and/or plasticizer. In this case, the amount of the organic binder contained in the molded part varies depending upon the characteristics of the powder to be blended, but usually it is preferably on the order of from 5 to 25% by weight, which corresponds to 40 to 60% by volume.

Polyethylene oxide is a water-soluble binder which dissolves completely in water at room temperature, and therefore it can readily be extracted with water without using any special organic solvent. In addition, plastic molding can be utilized since it has thermoplastic property. Furthermore, it has sufficient strength at room temperature, which enables raising the proportion of polyethylene oxide in the organic binder without decreasing the flowability of the kneaded mixture or the strength of the molded part. This means it is the most suitable organic binder to be extracted. Another advantage of polyethylene oxide as the organic binder used for the plastic molding of the powder is that it is compatible with other water-insoluble thermoplastic polymers, for example, polystyrene and polyethylene.

The molecular weight of the polyethylene oxide is preferably in the range of not lower than 50,000 and not higher than 5,000,000 since when its molecular weight is below 50,000, the strength of the molded part is insufficient although the flowability of the kneaded mixture and the extractability with water are both acceptable, and on the contrary, with its molecular weight being above 5,000,000, the strength of the molded part is acceptable but the flowability of the kneaded mixture and the extractability with water are insufficient. In order to obtain particularly good flowability and extractability with water, it is desirable to use polyethylene oxide having a molecular weight of not lower than 100,000 and not higher than 2,000,000.

As for the above-described lubricant or plasticizer in the organic binder, there can be used stearic acid, dioctyl phthalate, dibutyl phthalate and the like. Use of the Polyethylene oxide with the amount of 60 to 90% by weight as the water-soluble thermoplastic organic polymer makes it unnecessary to conduct the thermal debinding step prior to the sintering step. Therefore, the time required for the debinding can be greatly shortened remarkably.

In a still another aspect, the present invention gives a solution to the following problem. That is, the rate of extraction of the water-soluble thermoplastic polymer with water upon the removal of the binder decreases with lapse of the extraction time and for this reason it is difficult to complete extraction with a desired high degree of extraction in very short time. In addition, a desired degree of extraction is not obtained when the water-soluble thermoplastic polymer is extracted from the molded part which is large in size.

In order to solve the problem, the present invention provides a process for manufacturing a sintered body, comprising mixing a powder and an organic binder, plastic molding the mixture to obtain a molded part, and debinding and sintering the molded part, characterized in that as said debinding operation, the plastic molded part is brought into contact with water to extract said water-soluble thermoplastic polymer from the molded body while causing water to flow to extract the water-soluble thermoplastic polymer at high rates.

This process will be explained in detail hereinbelow.

At first, the binder and the organic binder are mixed, and the resulting mixture is plastic molded to obtain a molded part.

Next, the molded part is subjected to debinding treatment to give a debinded body. The debinding treatment is conducted by bringing the molded part into contact with water (including water at room temperature and hot water, hereinafter the same), and then the water which is in contact with the molded part is caused to flow, thus extracting the water-soluble polymer at high rates. The reason why the water in contact with the molded part is caused flow is as follows.

That is, when the molded part is dipped in water in order to remove the water-soluble polymer, the water-soluble polymer present in the surface portion of the molded part is extracted at first and diffused in water. The space in which the water-soluble polymer existed previously serves a passage for water which penetrates the molded part through the space, resulting in that the water-soluble polymer around or near the space is extracted with the water which penetrated the polymer, and the extracted water-soluble polymer is diffused through the passage into the water outside the molded part. This type of diffusion is repeated and the water-soluble polymer is removed one after another out of the molded part.

Figure 2:
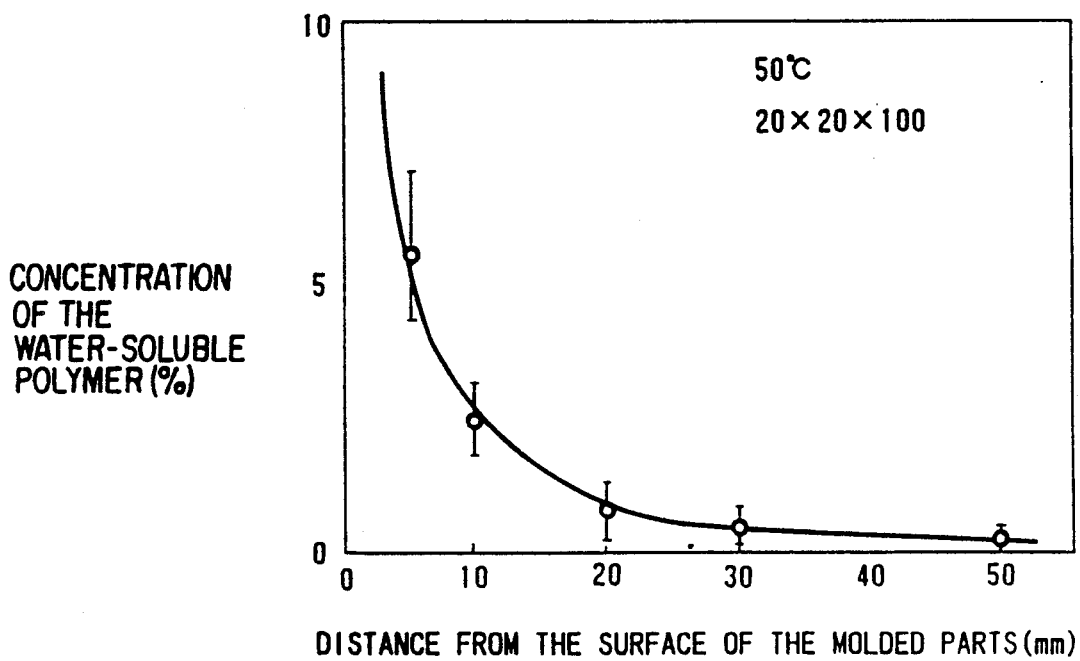

However, the degree of extraction of the water-soluble polymer when the molded part is simply dipped in water, for example, in the case of the molded part being a plastic molded part of stainless steel powder, is smaller with lapse of time and the rate of extraction of the water-soluble polymer decreases with increased size of the molded part as shown in FIG. 1. This phenomenon is ascribable to the speed of mass transfer of the water-soluble polymer, which is believed to occur due to the fact that its diffusion from the inside to the outside of the molded part and its diffusion from the surface of the molded part into water are rate-determining factors. Accordingly, the concentration of the water-soluble polymer which was extracted near the molded part at the time when the rate of extraction became low after dipping the molded part. The results obtained are shown in FIG. 2. FIG. 2 shows that the concentration of the extracted water-soluble polymer is higher on the side of the surface of the molded part but lower as the distance from the surface of the molded part increases. This confirms that the diffusion of the extracted water-soluble polymer in water gives an influence to the rate of extraction.

The temperature of water used for extraction in the measurement shown in FIGS. 1 and 2 is 50° C. The degree of extraction shown in FIG. 1 (as well as in other figures referred to hereinbelow) was calculated according to the following equation.

Degree of Extraction =

$$\frac{\text{Weight of Extracted Water-Soluble Polymer}}{\text{Weight of Water-Soluble Polymer in Molded Part}} \times 100$$

The above-described results suggest that the driving force of the transfer of the water-soluble polymer from the molded part into water (extraction) is proportional to the difference in the concentration. Thus, the rate of extraction is given according to the following equation.

(Rate of Extraction) = $Ka \cdot A(X - Xi)$ where
Ka is the mass tranfer coefficient of the water-soluble polymer,
A is area of contact,
X is the concentration of the water-soluble polymer at the interface, and
Xi is the concentration of the water-soluble polymer in water.

Therefore, it is understood from the above-described equation that the rate of extraction is high with increased Ka, and to obtain high Ka it is useful to reduce the thickness of the boundary layer present on the surface of the molded part. This is achieved by causing to flow the water which is in contact with the molded part to thereby extract the water-soluble polymer.

The method of debinding by causing water to flow will be explained in detail hereinbelow.

Figure 4:
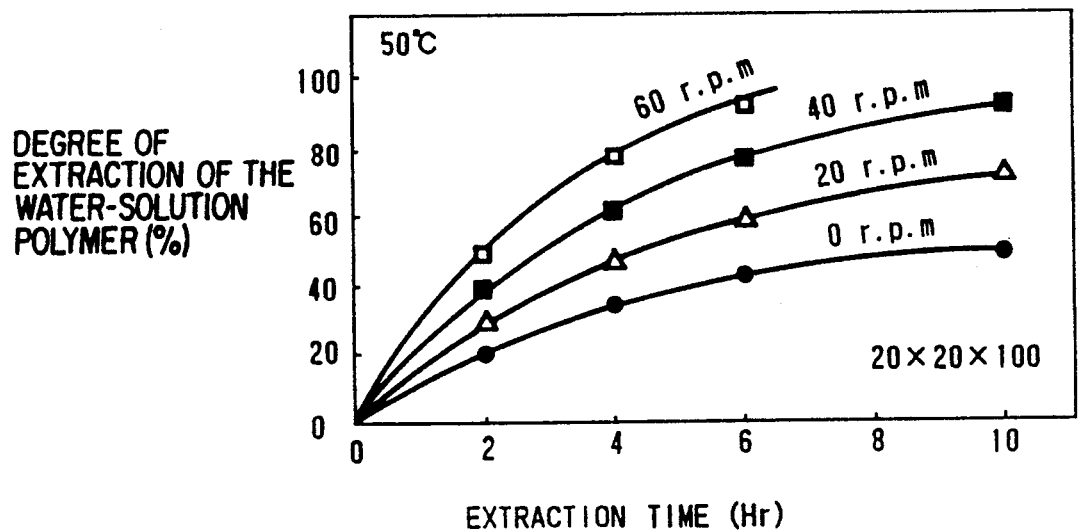

At first, a plurality of molded parts 1 are provided which are composed of an organic binder containing a water-soluble polymer and a water-insoluble polymer and stainless steel powder and which have a shape of square bar with a size of 20 mm×20 mm×100 mm. They are dipped in water 3 in an extraction bath 2, which is mounted on a base 4. The temperature of water 3 is 50° C. Next, a stirrer 5 equipped with the extraction bath 2 is driven to cause the water 3 to flow. This operation is performed at rotation speed of 60 rpm, 40 rpm and 20 rpm, and the relationship between the degree of extraction and the extraction time is determined. The results obtained are shown in FIG. 4. For comparison, the above-described relationship is also determined under the conditions where the molded parts 1 are simply dipped in the water 3 without stirring. The results obtained are also shown in FIG. 4.

From the results shown in FIG. 4, it is elucidated that the extraction time is shortened when the rotation speed is raised. It is also confirmed that high degree of extraction is achieved even with molded parts of large sizes. In the case where the organic binder blended is composed of the water-soluble polymer alone, the strength of the molded parts deteriorates as the degree of extraction increases, which causes danger of breakage of the molded parts during the extraction. On the other hand, since the organic binder used in the present invention contains the water-insoluble polymer in addition to the water-soluble polymer, the water-insoluble polymer remains even after the water-soluble polymer is extracted, which enables the molded parts to retain their strength, thus preventing the breakage of the molded parts during the extraction. However, the rotation speed of the stirrer must be set up appropriately since too high a rotation speed of the stirrer leads to moves of the molded parts themselves and there is a danger of breakage of the molded parts.

Figure 5:
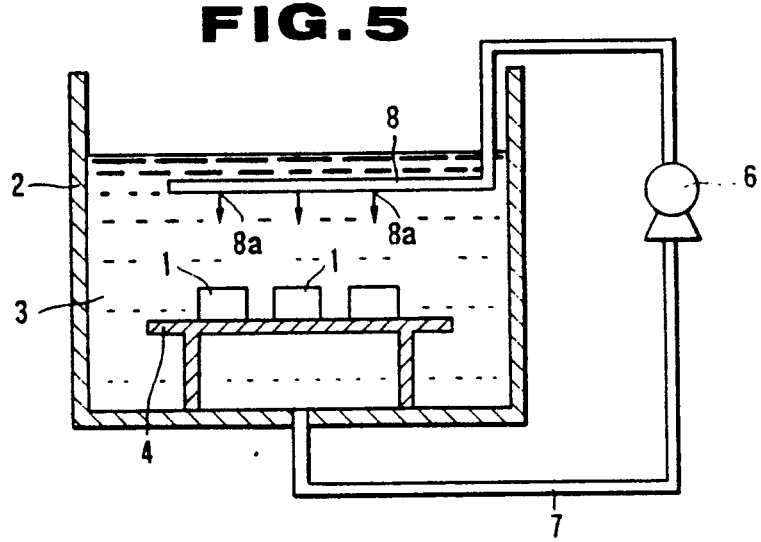

In order to cause water to flow, a water supply pump can be used instead of the stirrer. FIG. 5 illustrates an embodiment in which the water supply pump is used. In FIG. 5, reference numeral 6 indicates the water supply pump. In the construction shown in FIG. 5, the water supply pump 6 is connected to a suction pipe 7 arranged at the bottom of the extraction bath 2 and to a water supply pipe 8 having a plurality of water outlets 8a in the water 3 in the extraction bath 2. The water in the extraction bath 2 is sucked through the suction pipe 7 and fed through the water supply pipe 8 and circulated to the extraction bath 2 through the water outlets 8a. Thus, the water 3 in the extraction bath 2 is caused to flow. In this case, it is preferred that the water outlets 8a are arranged so as to oppose the molded parts 1 and the water near the molded parts 1 is forcibly flown.

Figure 6:
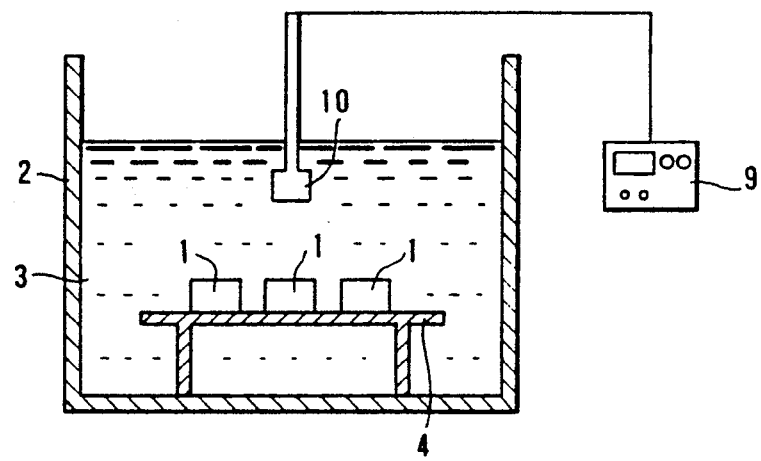
Figure 7:
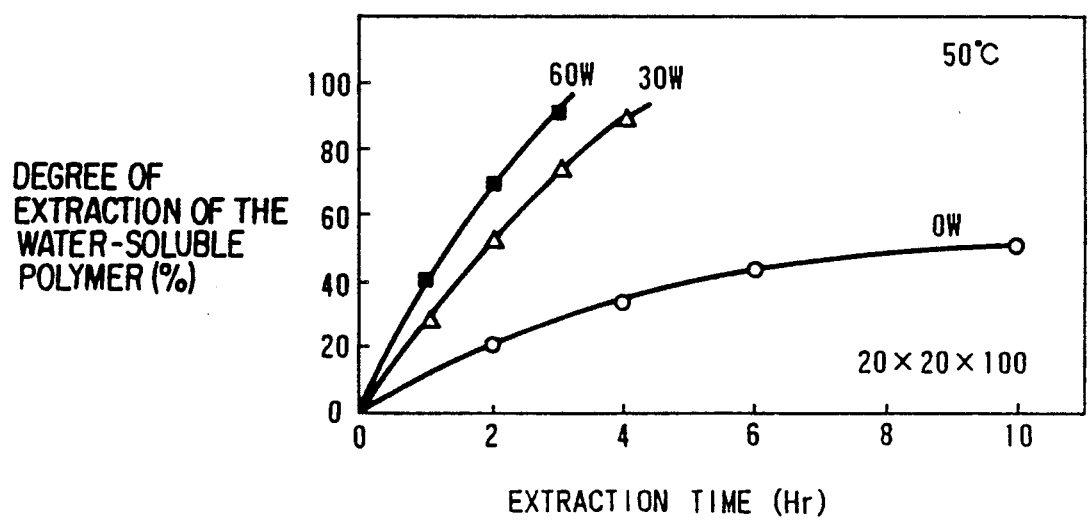

As shown in FIG. 6, supersonic wave can be used to cause water to flow. In FIG. 6, reference numeral 9 indicates a power unit, and 10 a supersonic wave vibrator. The supersonic wave vibrator 10 is disposed near the molded parts 1 in the water 3 in the extraction bath 2, and is controlled by the power unit 9. Upon application of the supersonic wave generated by the supersonic wave vibrator 10 to the water 3, a great number of cavitations are formed, which causes the water 3 to flow. The experiment of the extraction is made using the power unit 9 at an output of 60 watts and 30 watts to determine the relationship between the degree of extraction and the extraction time for the water-soluble polymer. The results obtained are shown in FIG. 7. The temperature of the water 3 is 50° C. For comparison, the above-described relationship is determined by dipping the molded parts 1 in the water 3 without applying the supersonic wave thereto. The results obtained are also shown in FIG. 7. The molded parts 1 used are plastic molded parts composed of powder of Fe-8% Ni alloy. Their size and shape are the same as those used in the embodiment shown in FIG. 3.

From the results shown in FIG. 7, it was revealed that the method of flowing using supersonic wave gives higher extraction rate of the water-soluble polymer and better effect of extraction than those obtained with the above-described stirring method. Also, it was confirmed that this method is more effective than the method of causing water to flow using the water supply pump. This is believed to be due to the fact that in the supersonic wave method, not the water 3 but also the molded parts 1 can be oscillated by the supersonic wave so that the diffusion of the water-soluble polymer from the inside of the molded parts 1 to the surface thereof can be accelerated. The reason why the supersonic wave method is more effective for the molded parts 1 whose powder have smaller particle size is believed that this phenomenon relates to the diffusion in the inside of the molded parts as described above and the rate of extraction is inversely proportional to square of the particle size of the powder. The rate of extraction is higher with higher output of the supersonic wave. However, the molded parts are broken when the output of the supersonic wave is too high. Therefore, the power for supersonic wave must be selected appropriately.

In these methods, when a large number of the molded parts 1 are charged in the extraction bath 2 for extracting the water-soluble polymer, the concentration of the polymer in the extraction bath 2 will increase and there is a possibility that the degree of extraction reaches saturation. However, when the amount of the water-soluble polymer to be extracted is not lower than 20 to 30% based on the total amount of the binder, the time of subsequent heat treatment can be reduced to a greater extent, and therefore total time required for the debinding can be shortened sufficiently.

Figure 3:
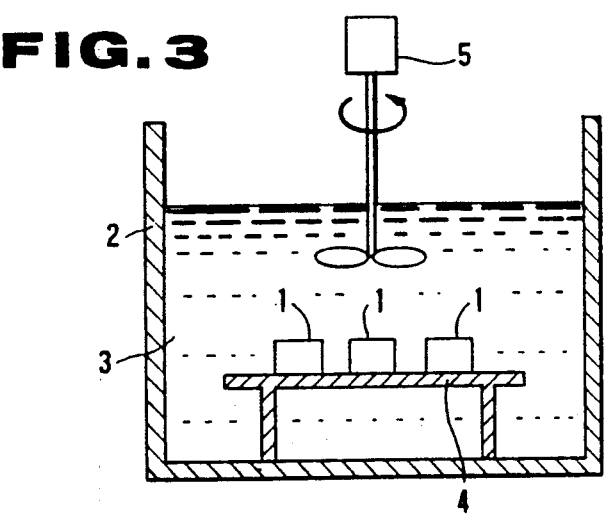

The effects of the methods of causing the water to flow shown in FIGS. 3, 5 and 6 can well be obtained not only for molded parts comprised of metal powders but also for those comprised of ceramics powders.

In a further aspect, the present invention provides the following solution to the problem of decrease in the rate of extraction with water of the water-soluble thermoplastic binder at the time of removing the binder. That is, upon bringing the molded part in contact with water to extract the water-soluble thermoplastic polymer, the water-soluble thermoplastic polymer is extracted from the molded part by discharging at least a portion of the water to be brought in contact with the molded part to the outside of the system, while supplying into the system water containing the water-soluble thermoplastic polymer or water containing the water-soluble thermoplastic polymer in a concentration lower than the water near the molded part.

This solution will be explained in detail hereinafter.

In the debinding treatment, at first the molded part is brought into contact with water (including water at room temperature and hot water, hereinafter the same), and at least a portion of the water in contact with the molded part is discharged to the outside of the system while supplying into the system water containing no water-soluble thermoplastic polymer or water containing the water-soluble thermoplastic polymer in a concentration lower than the water in contact with the molded part. By so doing, the rate of extraction of the water-soluble polymer can be made higher if the concentration ($X_i$) of the water-soluble polymer in water is made lower. Taking this into consideration, the water is discharged from the extraction bath in which the molded part has been brought into contact with water while supplying to the extraction bath water containing no water-soluble thermoplastic polymer or water containing the water-soluble thermoplastic polymer in a concentration lower than the water in contact with the molded part, thus keeping the concentration of the water-soluble polymer in the extraction bath at low levels and enabling rapid extraction of the water-soluble polymer from the molded part.

The debinding method in which fresh water is supplied to the system while discharging water from the system is explained concretely. At first, a plurality of molded parts composed of the organic binder comprised of the water-soluble polymer and water-insoluble polymer and the stainless steel powder are provided. From the molded parts is removed the water-soluble polymer using an apparatus as shown in FIG. 8.

Figure 8:
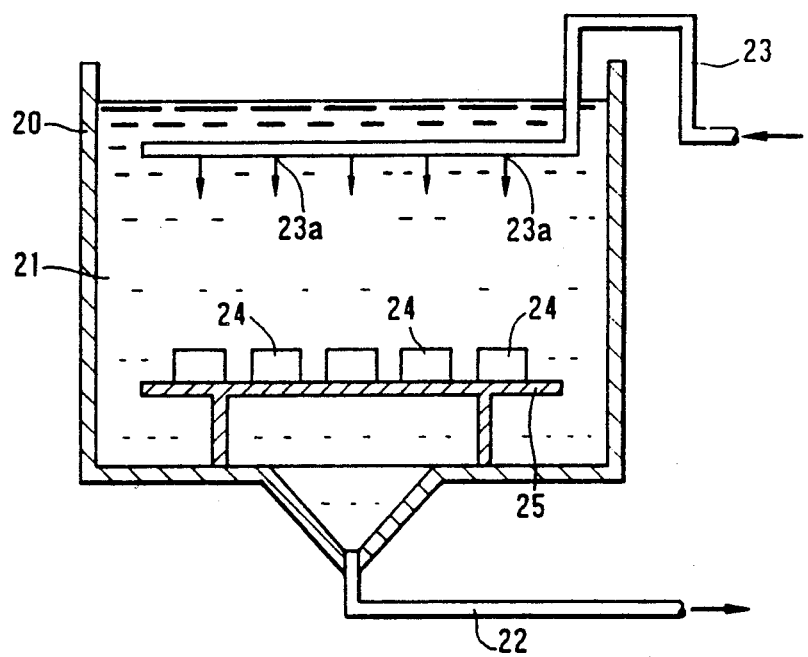

FIG. 8 illustrates an example of apparatus for extracting the water-soluble polymer from the molded parts. In FIG. 8, reference numeral 20 indicates an extraction bath. The extraction bath 20 is provided at its bottom with a discharge pipe 22 for discharging water 21 in the extraction bath 20, and at the side wall thereof with a water supply pipe 23 for supplying water containing no water-soluble polymer from a water source (not shown) into the extraction bath 20. The water supply pipe 23 is formed at the tip thereof which is to be positioned in water 21 with a plurality of water outlets 23a, from which outlets water is supplied in such a manner that substantially the same amount of water is discharged from the discharge pipe 22 as the amount of the water supplied, thus continuously replacing the water in the extraction bath 20.

Figure 9:
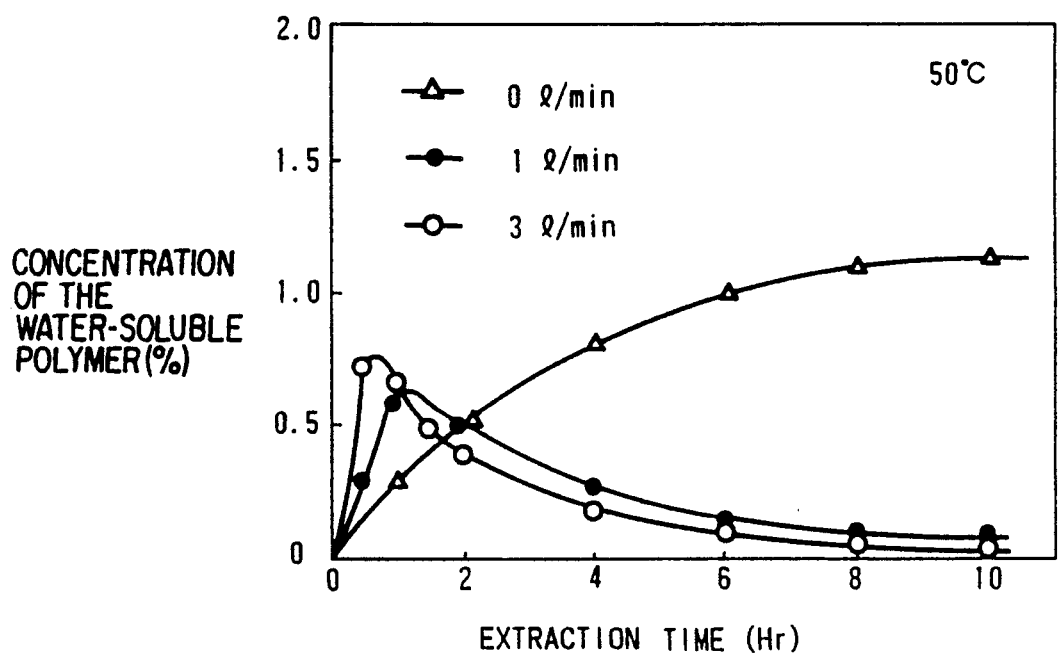
Figure 10:
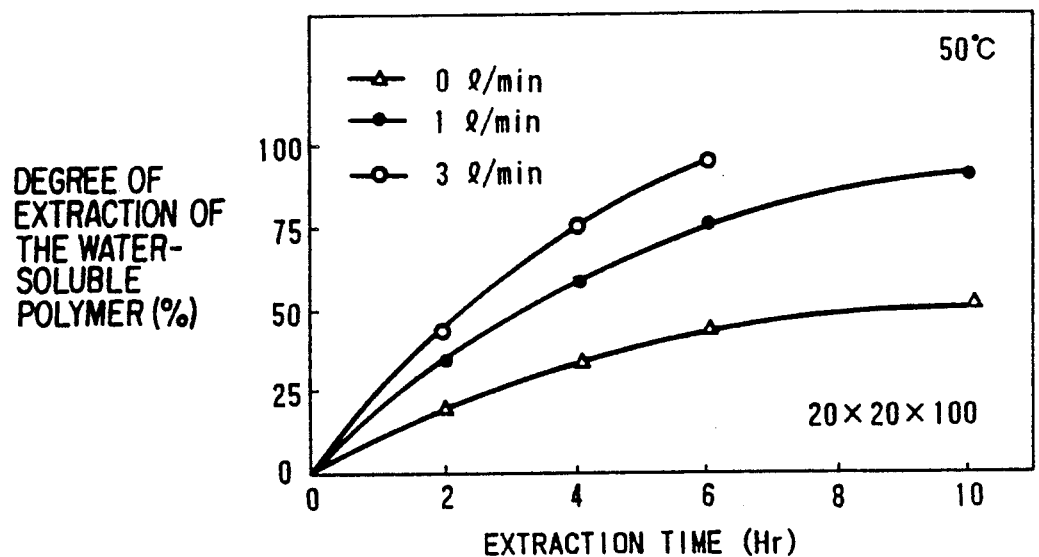

In order to remove the water-soluble polymer from the molded parts using the extraction bath 20, a plurality of the molded parts 24 previously provided are dipped in the water 21 in the extraction bath 20, and the bath is mounted on a stand 25. The water is discharged through the discharge pipe 22 while supplying fresh water through a water supply pipe 23 in the same amount as that of the water discharged. Thus, the water-soluble polymer is extracted from the molded parts 24 to the water 21. The relationship between the extraction time (dipping time) of water discharged through the discharge pipe 22 and the concentration of the water-soluble polymer is determined and the results obtained are shown in FIG. 9. Also, the relationship between the degree of extraction of the water-soluble polymer and the extraction time thereof is also determined and the results obtained are shown in FIG. 10. In the above cases, the amount of water supplied is 1 liter/min. or 3 liters/min. The molded parts 24 are square bars of 20 mm × 20 mm × 100 mm in size. For comparison, determination is made on the change in the concentration of the water-soluble polymer in the extraction bath and the degree of extraction of the water-soluble polymer when supply and discharge of water is not conducted. The results obtained are shown in FIGS. 9 and 10.

From the results shown in FIG. 9, it is understood that the concentration of the water-soluble polymer in the extraction bath 20 is kept low, since the concentration of the polymer in the discharged water is low when the supply and discharge of water is conducted, and therefore it can be supposed that the rate of extraction of the water-soluble polymer from the molded parts is raised. The results shown in FIG. 10 indicate that the rate of extraction is evidently high with the supply and discharge of water as compared with the case where the supply and discharge of water is not conducted, which confirms the above supposition based on FIG. 9. This effect is more evident with increased amount of water to be supplied and discharged, and sufficiently high degree of extraction can be attained even for molded parts with large sizes.

Figure 11:
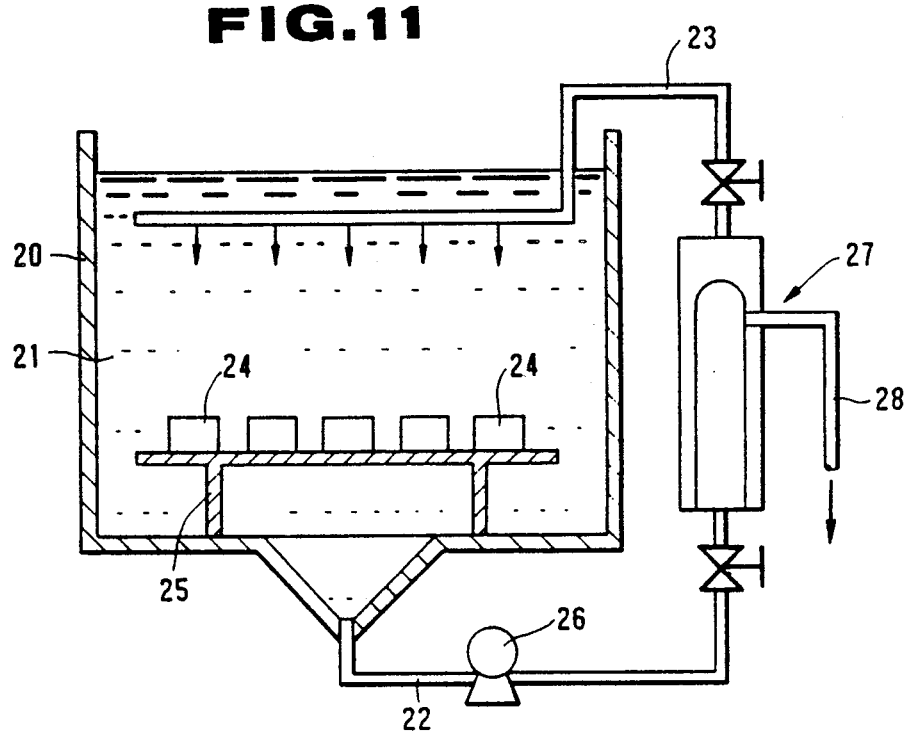

As for the apparatus for extracting the water-soluble polymer from the molded parts, there can be used an apparatus of a construction as shown in FIG. 11. The apparatus shown in FIG. 11 is suitable for practicing the process of the present invention and differs from the apparatus shown in FIG. 8 in that the discharged water from the discharge pipe 22 is led to the water supply pipe 23 through a circulation pump 26 and a separator 27, thus circulating it in the extraction bath 20. In the extraction bath 20 shown in FIG. 11, the separator 27 includes a separation membrane (not shown) for selectively separating the water-soluble polymer in the discharged water and a branch pipe 28 for discharging out of the system the aqueous solution of the water-soluble polymer separated and existing in high concentrations. The apparatus is designed for separating and removing the water-soluble polymer from the discharged water fed by the circulation pump 26 and for supplying an aqueous solution of the water-soluble polymer in a low concentration to the extraction bath 20. As for the separation membrane, there can be used precision filtration separation membrane, ultrafiltration separation membrane, reverse osmosis separation membrane and the like. They are selected appropriately according to the molecular weight of the water-soluble polymer to be extracted therethrough.

When the water-soluble polymer is extracted from the molded parts 24 using the apparatus having the above-described construction, supply of water containing the water-soluble polymer in a concentration lower than that of the water in the extraction bath 20 while discharging the water in contact with the molded parts 24 from the extraction bath 20 results in elevation of the rate of extraction of the water-soluble polymer from the molded parts in the same manner as in the earlier explained process and at high degrees of extraction even for the molded parts with large sizes.

Figure 12:
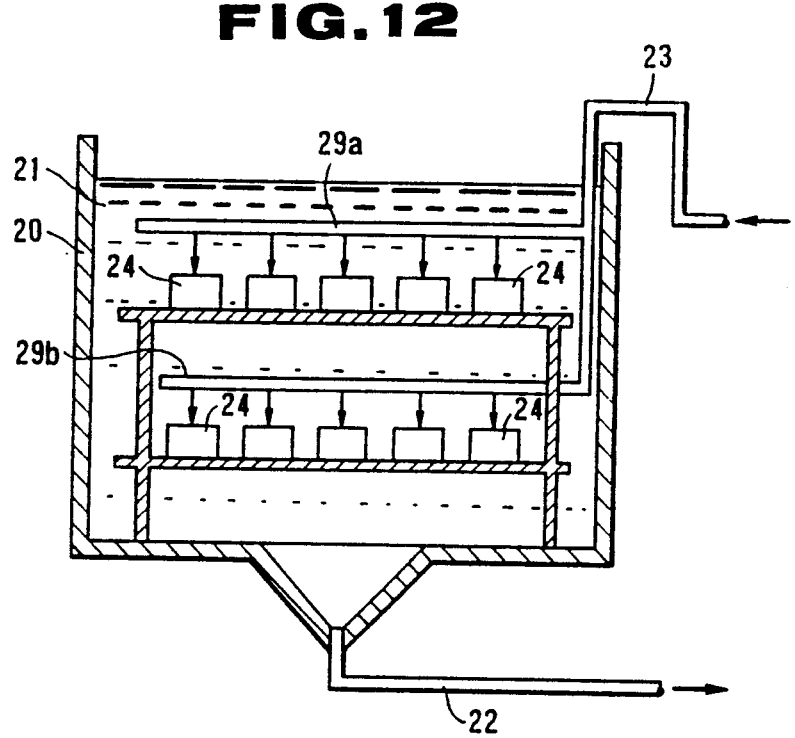

Furthermore, as for the apparatus for extracting the water-soluble polymer from the molded parts, there can be used also an apparatus having a construction as shown in FIG. 12. The apparatus shown in FIG. 12 is suitable for practicing the process of the present invention and differs from the apparatus shown in FIG. 8 in that water freshly supplied from the water supply pipe is sprayed to the molded parts directly or indirectly through the water 21 in the extraction bath 20. In the extraction bath 20 shown in FIG. 14, the water supply pipe 23 has at its tip positioned under the water 21 branched portions 29a and 29b, which are constructed so that they are positioned near and immediately above the molded parts 24 arranged in multistories. The branched portions 29a and 29b of the water supply pipe 23 each are provided with a plurality of water outlets (not shown), and the water supplied from the water supply pipe 23 can be sprayed onto the molded parts 24 directly or indirectly through the water 21 in the extraction bath 20. In the same manner as in the apparatus shown in FIG. 8, the water supply pipe 23 is connected to the water source and supplies water containing no water-soluble polymer into the extraction bath 20.

Figure 13:
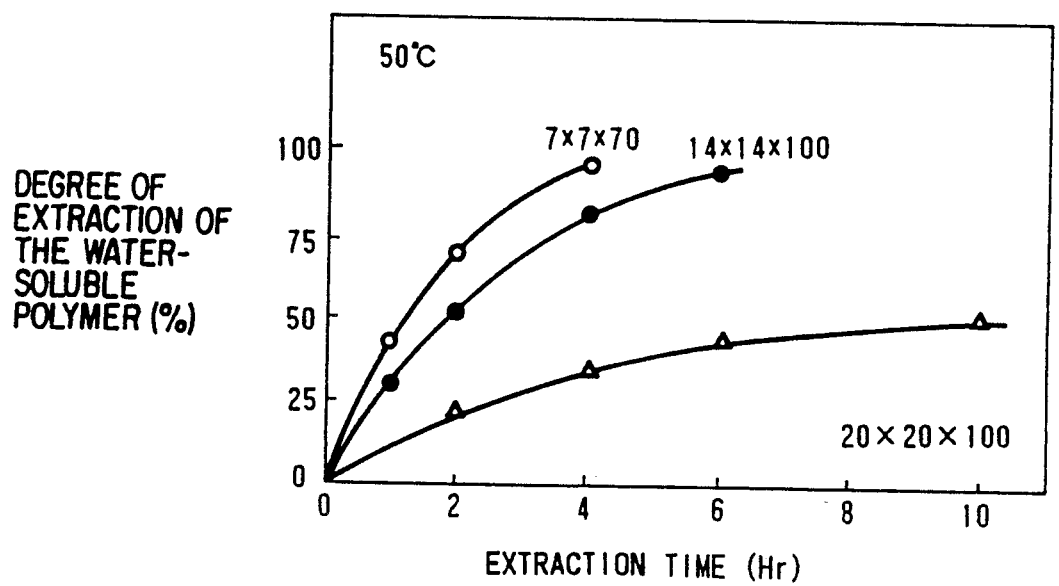

Using the above-described apparatus, water is supplied into the extraction bath 20 at a flow rate of 3 liters/min. and the water supplied is sprayed onto the molded parts 24 to perform extraction. Thus, the relationship between the degree of extraction of the water-soluble polymer and the extraction time thereof is determined. The results obtained are shown in FIG. 13. The size and shape of the molded parts 24 are the same as in the previous example, that is square bars of 20 mm × 20 mm × 100 mm in size. For comparison, degree of extraction in the case where the supply and discharge of water is not conducted is indicated.

From the results shown in FIG. 13, it is revealed that the method of spraying the supplied water onto the molded parts 24 is more effective than the method in which the water 21 in the extraction bath 20 is simply replaced using the apparatus having the construction shown in FIG. 8. This is believed mainly due to the fact that direct contact of water flow with the molded parts increases the mass transfer coefficient, which in turn increases diffusion of water and the water-soluble polymer.

In the above embodiment, the water supply pipe 23 is connected with the water source. However, it can be connected with the discharge pipe 22 through the circulation pump and the separator as in the embodiment shown in FIG. 11 in order to supply aqueous solution containing a low concentration of the water-soluble polymer.

In addition, the effects attained by the methods in which the elution water is replaced as in the embodiments shown in FIGS. 8, 11 and 12 can also be obtained not only for molded parts comprised of metal powders but also for those comprised of ceramics powders. And, when polyethylene oxide is used in larger amounts as the water-soluble thermoplastic organic polymer, the subsequent sintering step can be carried out immediately without performing the thermal debinding step, with the result that the time required for the debinding can be shortened to a greater extent.

EXAMPLES

The present invention will be explained in greater detail with reference to examples which should not be construed as being limiting the present invention thereto.

EXAMPLE 1

With 100 parts by weight of Fe-8%-Ni alloy powder (mean particle size: 8 μm) were blended 5 parts by weight of polyethylene oxide as the water-soluble thermoplastic resin, 3 parts by weight of polyethylene as the water-insoluble thermoplastic resin, and 1 part by weight of stearic acid as the lubricant. The mixture was kneaded at 150° C. for 60 minutes using a kneader. Then, the kneaded mixture obtained was pulverized and molded using a screw type injection molding machine to obtain molded parts having a ring-form complicated contour (the area of the thickest portion: 5×6 mm). In this case, the temperature of injection was 170° C., and these pressure of injection was 1,000 kg/cm².

Figure 14:
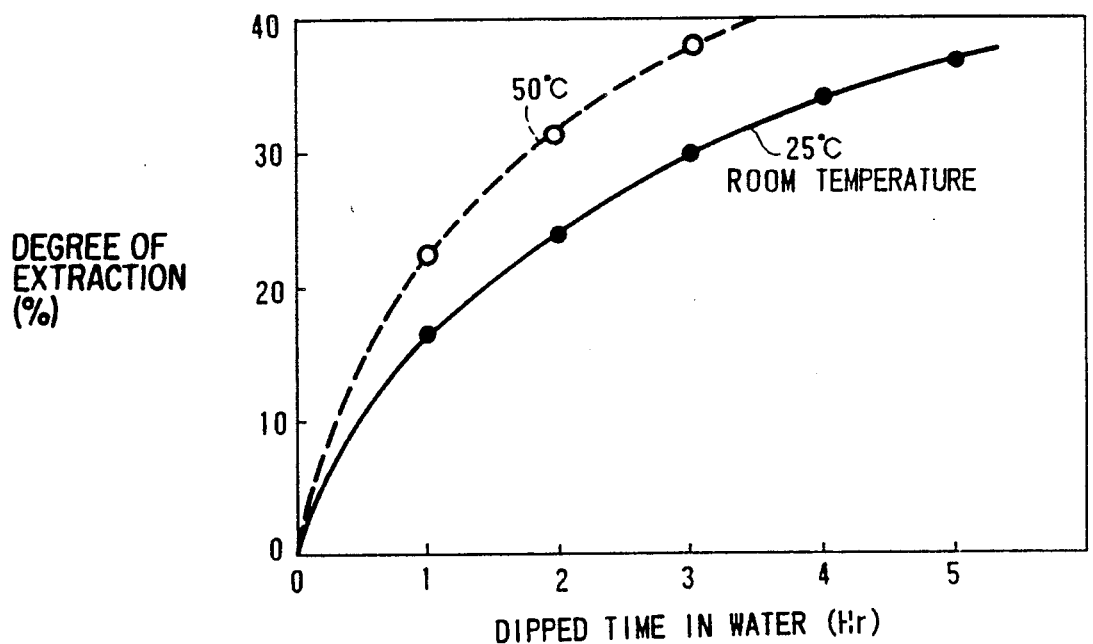

Then, the thus-obtained molded parts were dipped in water at room temperature and water at 50° C. each for 1 to 5 hours. After taking out of the water, the molded parts were dried under vacuum for 30 minutes. The relationship between the degree of extraction and the time for which the molded parts were dipped in water was determined. The results obtained are shown in FIG. 14 and Table 1.

Further, the dried molded parts were introduced in a nitrogen atmosphere furnace and the temperature was raised at a heating rate of 100° C./hour to 450° C. and retained at that temperature for 1 hour to obtain debinded products. The conditions of the debinded products were observed and the results obtained are also shown in Table 1.

As a comparative example in comparison to Example 1, the same treatment as above was repeated except that an ethylene/vinyl acetate copolymer-wax-butyl polymethacrylate based binder was used to obtain debinded products, and their conditions were observed. The results obtained are also shown in Table 1.

TABLE 1

| Run | Temp. of Water | Time of Dipping | Degree of Extraction T | Heating Rate (°C./hr) | | |
|---|---|---|---|---|---|---|
| | | | | 10 | 50 | 100 |
| Example | 25° C. | 1 Hour | 16% | A | B | C |
| | 25° C. | 2 Hours | 24% | | A | B |
| | 25° C. | 3 Hours | 30% | | A | A |
| | 25° C. | 5 Hours | 37% | | A | A |
| Comp. EX. | 25° C. | 5 Hours | 0% | A | C | C |
| Example | 50° C. | 1 Hour | 23% | A | A | C |
| | 50° C. | 2 Hours | 32% | | A | A |
| | 50° C. | 3 Hours | 38% | | A | A |
| Comp. Ex. | 50° C. | 5 Hours | 0% | A | C | C |

A: Fair
B: Internal cracks occur
C: Swelling occurs
"Comp. Ex." stands for comparative example.

As shown in Table 1, the debinded products according to the example of the present invention showed no swelling nor cracks or deformation for those held in water at room temperature (25° C.) for not less than 3 hours or those held in water at 50° C. for not less than 2 hours, and they were confirmed to be fair debinded products.

On the other hand, the occurrence of cracks inside the debinded products were observed in the comparative example.

Thereafter, the debinded products were sintered in a hydrogen atmosphere in a heating furnace at 1,350° C. for 2 hours, and their sintered density was determined to be 7.62 g/cm³. Thus, it was confirmed that the sintered bodies obtained had high sintered density.

EXAMPLE 2

With 100 parts by weight of 316L Stainless Steel powder (mean particle size: 8 μm) were blended 6 parts by weight of polyethylene oxide, 3 parts by weight of polystyrene, 2 parts by weight of a plasticizer and lubricant, and the resulting mixture was subjected to kneading and injection molding in the same condition as in Example 1 to obtain molded parts of the same shape as those obtained in Example 1.

Next, the thus-obtained molded parts were dipped in water at 50° C. for 4 hours. After taking out of the water, the molded parts were dried under vacuum for 30 minutes. Their degree of extraction T was determined to be 47%.

Then, the temperature of the dried molded parts was elevated at a heating rate of 100° C./hour to 300° C. and retained at that temperature for 1 hour in the air to obtain debinded products. Upon observation of the conditions of the debinded products, no swelling nor crack occurred and 98% of the binder was removed.

Thereafter, the debinded products were sintered under vacuum in a heating furnace at 1,350° C. for 2 hours. Their sintered density was determined to be 7.87 g/cm³, which confirmed that they had high sintered density.

EXAMPLE 3

With 100 parts by weight of the same 316L Stainless Steel powder as used in Example 2 were blended 5 parts by weight of polyethylene oxide, 1 part by weight of polyethylene glycol, 3.5 parts by weight of polystyrene, 1.5 parts by weight of a plasticizer and lubricant, and the resulting mixture was subjected to kneading and injection molding in the same condition as in Example 1 or 2 to obtain molded parts in the form of square bars of a size of 7 mm×7 mm×70 mm.

Figure 15:
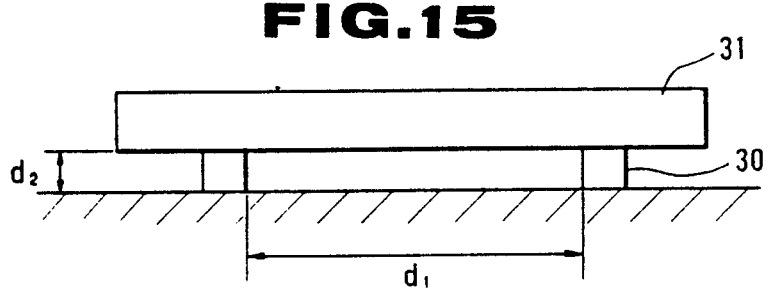

Next, the thus-obtained molded parts were dipped in water at room temperature for 2 to 10 hours. After taking out of the water, the molded parts were dried under vacuum for 1 hour. The dried molded parts were arranged on a stand 30 as shown in FIG. 15. Their temperature was elevated at a heating rate of 100° C./hour to 300° C., and retained at that temperature for 1 hour in the air. Thereafter, the degree of extraction T, the amount of deformation, and the presence of defects were examined. The results obtained are shown in Table 2. In FIG. 15, reference numeral 31 indicates molded parts, and the sizes d₁ and d₂ are 50 mm and 5 mm, respectively.

TABLE 2

| Time of Dipping (hrs) | Degree of Extraction (%) | Amount of Deformation | Particulars of Defects |
|---|---|---|---|
| 2 | 14 | Large | Swelling |
| 5 | 27 | None | Cracks inside |
| 10 | 37 | None | None |

As shown in Table 2, the central portion of the molded part 31 hanged down due to gravitation during debinding and deformation was to a great extent when the dipping time was 2 hours. On the other hand, when the dipping time was not less than 5 hours, the molded parts were debinded in the state where they were originally arranged. With dipping for 10 hours, the degree of extraction T was 37% and it was confirmed that the molded parts were debinded without suffering deformations or defects.

EXAMPLE 4

The same composition as used in Example 2 was provided. The mixture was kneaded and injection molded in the same condition as in Example 1, 2 or 3 to obtain molded parts having the same shape as those obtained in Example 1 or 2.

Next, the molded parts were dipped in water at 50° C. for 4 hours to remove 47% of the binder.

Then, the molded parts were dried, and the temperature of the dried molded parts was elevated at a heating rate of 150° C./hour to 400° C. in an atmosphere under reduced pressure, 500 mg, and retained at that temperature for 1 hour to obtain good debinded products free of swelling or cracks.

EXAMPLE 5

With 100 parts by weight of partially stabilized $ZrO_2$ containing 3 mol % of $Y_2O_3$ and having a mean particle size of 0.64 μm and a specific surface area of 6.80 m²/g were blended 10 parts by weight of polyethylene oxide, 7 parts by weight of polyethylene, and 3 parts by weight of stearic acid, and the resulting mixture was kneaded at 150° C. for 60 minutes using a kneader. The thus-obtained kneaded mixture was pulverized and injection molded under the conditions of an injection temperature of 165° C. and an injection pressure of 1,000 kg/cm² using a screw-type injection molding machine to obtain molded parts in the form of square bars of a size of 7 mm×7 mm×70 mm.

Figure 16:
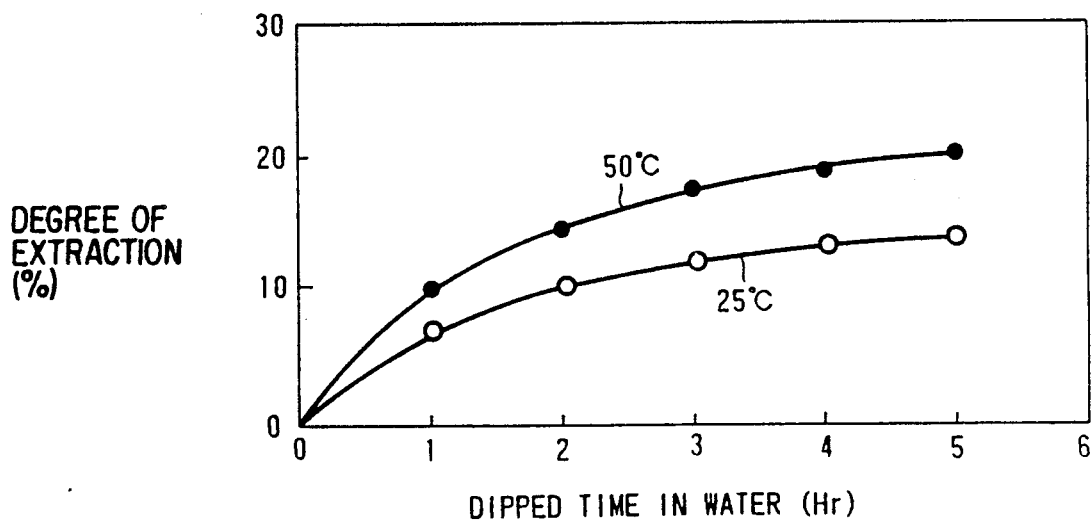

Next, the resulting molded parts were dipped in water at 25° C. and water at 50° C. for 1 to 5 hours. After taking out of the water, they were dried under vacuum. The relationship between the degree of extraction T and the time for which the molded parts were dipped in water was examined, and the results obtained are shown in FIG. 16.

Then, the molded parts which had a degree of extraction T of 20% (extraction time: 5 hours) were selected and the temperature thereof was elevated from room temperature to 100° C. in 1 hour in the air. Upon examination of the resulting debinded products, it revealed that they had a degree of debinding of 98%, they had no defect and they were able to be debinded in shorter time than conventionally.

The debinded products were sintered at 1,450° C. for 4 hours in an open air atmosphere, and the density of the sintered bodies was determined to be 6.02 g/cm³. The sintered bodies obtained were defect-less sintered bodies having no swelling or cracks.

As comparative example in comparison with Example 5, a binder mainly composed of polystyrene, atactic polypropylene was added to the above-described $ZrO_2$ and the resulting mixture was molded to give molded parts, which were debinded in the same condition as described above, defects such as swelling and cracks were noted.

EXAMPLE 6

With 100 parts by weight of 316L Stainless Steel powder (mean particle size: 8 μm) were blended 8.5 parts by weight of polyethylene oxide having a molecular weight of 600,000 to 1,100,000, 3 parts by weight of polyethylene, and 0.5 part by weight of stearic acid. The mixture was kneaded at 150° C. for 60 minutes using a kneader. Then, the kneaded mixture obtained was pelletized and the pellets were injection molded to obtain molded parts having a ring-form complicated contour (the area of the thickest portion: 5×6 mm). In this case, the temperature of injection was 170° C., and the pressure of injection was 800 kg/cm².

Then, the thus-obtained molded parts were dipped in water at 50° C. for 4 hours. After taking out of the water, the molded parts were dried in the open air at 50° C. for 60 minutes. The degree of extraction T was examined and it was found that 70% by weight of the binder based on the total organic binder was removed. Thereafter, the temperature of the dried debinded products was elevated to 1,350° C. at the heating rate of 5° C./minute (300° C./hour), and sintered for 2 hours.

The density of the sintered bodies was determined to be 7.84 g/cm³, which confirmed that they had high sintered density.

EXAMPLE 7

With 100 parts by weight of the same 316L Stainless Steel powder as used in Example 6 were blended 9 parts by weight of polyethylene oxide having a molecular weight of 600,000 to 1,100,000, 2 parts by weight of polyethylene, 0.7 part by weight of ethylene/vinyl acetate copolymer, and 0.3 part by weight of stearic acid, and the resulting mixture was subjected to kneading and injection molding in the same condition as in Example 1 to obtain molded parts in the form of lumps of a size of 5 mm×5 mm×10 mm.

Next, the thus-obtained molded parts were dipped in water at room temperature for 8 hours. After taking out of the water, the molded parts were dried in the air at 50° C. for 60 minutes. The degree of extraction T was examined and it was confirmed that 75% by weight of the binder based on the total organic binder was removed. Thereafter, the dried debinded products were sintered under the same conditions as in Example 1.

The density of the sintered bodies was determined to be 7.86 g/cm³, which confirmed that they had high sintered density.

EXAMPLE 8

With 100 parts by weight of pure iron powder (mean particle size: 5 μm) were blended 8 parts by weight of the same polyethylene oxide as used in Example 6, 1.5 parts by weight of polyethylene, 1 part by weight of atactic polypropylene, and 0.5 part by weight of stearic acid, and the resulting mixture was subjected to kneading and injection molding in the same condition as in Example 6 to obtain molded parts in the form of square bars of a size of 7 mm×7 mm×70 mm.

Next, the thus-obtained molded parts were dipped in water at room temperature for 8 hours. After taking out of the water, the molded parts were dried in the air at 70° C. for 60 minutes. The degree of extraction T of the binder was examined and it was confirmed that 72% by weight of the binder based on the total organic binder was removed. Thereafter, the temperature of the dried debinded products was elevated in a hydrogen atmosphere at the heating rate of 5° C./minute to 1,350° C., and sintered at that temperature for 1 hour.

The density of the sintered bodies was determined to be 7.55 g/cm³, which confirmed that they had high sintered density.

EXAMPLE 9

With 100 parts by weight of 316L Stainless Steel powder (mean particle size: 8 μm) were blended 5 parts by weight of polyethylene oxide as the water-soluble thermoplastic resin, 3 parts by weight of polyethylene as the water-insoluble thermoplastic resin, and 1 part by weight of stearic acid as the lubricant. The mixture was kneaded at 150° C. for 45 minutes using a kneader. Then, the kneaded mixture obtained was pulverized and molded using a screw type injection molding machine to obtain three kinds of molded parts in the form of bars with sizes as set forth below.

[a] 7 mm×7 mm×70 mm,
[b] 14 mm×14 mm×100 mm, and
[c] 20 mm×20 mm×100 mm.

In this case, the temperature of injection was 165° C., and the pressure of injection was 1,000 kg/cm².

Then, the thus-obtained molded parts were extracted for 4 hours with water at 50° C. using the apparatus shown in FIG. 3 at a rotation speed of the stirrer of 40 rpm. The degree of extraction was 93% for [a] 82% for [b] or 62% for [c] as partly shown in FIG. 4. Then, after drying the molded parts under vacuum the temperature of the molded parts was elevated from room temperature to 100° C. in 0.5 hour, from 100° C. to 300° C. in 3 hours, and retained at 300° C. for 0.5 hour. Upon examination of the debinded body, none of the parts showed swelling or cracks, and it revealed that from 95% to 98% of the binder was removed.

The debinded body was sintered at 1,350° C. for 2 hours under vacuum. The sintered density was determined to be 7.88 g/cm³ for [a], 7.85 g/cm³ for [b], and 7.81 g/cm³ for [c], which confirmed that they had high sintered density.

EXAMPLE 10

With 100 parts by weight of Fe-8%-Ni alloy powder (mean particle size: 8 μm) were blended 6 parts by weight of polyethylene oxide as the water-soluble polymer, 3 parts by weight of polyethylene as the water-insoluble polymer, and 2 parts by weight of the plasticizer and lubricant. The mixture was kneaded and injection molded in the same condition as in Example 9 to obtain molded parts having the same size and shape as those obtained in Example 9.

Next, the resulting molded parts were extracted for 3 hours using the apparatus shown in FIG. 6 under the conditions of supersonic wave output of 30 watts. As partly shown in FIG. 7, the degree of extraction was 96% for [a], 86% for [b] and 74% for [c]. Then, the molded parts were debinded by heating in the same condition as in Example 9 after drying them under vacuum, with the result that none of the molded parts had defects.

Thereafter, the debinded bodies thus-treated were sintered at 1,350° C. for 2 hours, and their sintered density was determined to be 7.69 g/cm³ for [a], 7.66 g/cm³ for [b] and 7.64 g/cm³ for [c], which confirmed that they had high sintered density.

EXAMPLE 11

With 100 parts by weight of partially stabilized zirconia containing 3 mol % of $Y_2O_3$ and having a mean particle size of 0.64 μm and a specific surface area of 6.80 m²/g were blended 8 parts by weight of polyethylene oxide as the water-soluble polymer, 2 parts by weight of polyethylene glycol, 6 parts by weight of polyethylene as the water-insoluble polymer, and 2 parts by weight of stearic acid, and the resulting mixture was kneaded at 150° C. for 45 minutes using a kneader. The thus-obtained kneaded mixture was pulverized and injection molded using a screw-type injection molding machine under the conditions of an injection temperature of 165° C. and an injection pressure of 950 kg/cm² to obtain molded parts in the form of square bars having the same size and shape as those in Example 9.

Next, the resulting molded parts were extracted for 4 hours under the same conditions as in Example 10. The degree of extraction was 90% for [a], 72% for [b] and 60% for [c].

Then, the temperature of the molded parts after drying under vacuum was elevated from room temperature to 100° C. in 0.5 hour and from 100° C. to 400° C. in 6 hours, and retained at 400° C. for 0.5 hour. Upon examination of the resulting debinded products, it revealed that they had a degree of debinding of from 94% to 98%, and they had no defect. The total time required for the removal of the binder was 14 hours, which was shortened considerably as compared with that of the conventional method.

The debinded products were sintered at 1,450° C. for 4 hours in an open air atmosphere, and the density of the sintered bodies was determined to be from 6.0 g/cm³ to 6.03 g/cm³. The sintered bodies obtained had no defect.

EXAMPLE 12

With 100 parts by weight of 316L Stainless Steel powder (mean particle size: 8 μm) were blended 5 parts by weight of polyethylene oxide as the water-soluble thermoplastic resin, 3 parts by weight of polyethylene as the water-insoluble thermoplastic resin, and 1 part by weight of stearic acid as the lubricant. The mixture was kneaded at 150° C. for 45 minutes using a kneader. Then, the kneaded mixture obtained was pulverized and molded using a screw-type injection molding machine to obtain three kinds of molded parts in the form of bars with sizes as set forth below.

[a] 7 mm×7 mm×70 mm,
[b] 14 mm×14 mm×100 mm, and
[c] 20 mm×20 mm×100 mm.

In this case, the temperature of injection was 165° C., and the pressure of injection was 1,000 kg/cm².

Then, the thus-obtained molded parts were extracted for 5 hours with water at 50° C. using the apparatus shown in FIG. 8 under the conditions of a water flow rate of 1 liter/minute for water supply and discharge. The degree of extraction was 92% for [a], 80% for [b] or 65% for [c] as partly shown in FIG. 10. Then, after drying the molded parts under vacuum, the temperature of the molded parts was elevated in an open air atmosphere from room temperature to 100° C. in 0.5 hour, from 100° C. to 300° C. in 3 hours, and retained at 300° C. for 0.5 hour. Upon examination of the debinded body, none of the parts showed swelling or cracks, and it revealed that from 95% to 98% of the binder was removed.

Then, the debinded bodies were sintered at 1,350° C. for 2 hours under vacuum. The sintered density was determined to be 7.87 g/cm³ for [a], 7.85 g/cm³ for [b], and 7.80 g/cm³ for [c], which confirmed that they had high sintered density.

EXAMPLE 13

With 100 parts by weight of Fe-8%-Ni alloy powder (mean particle size: 8 μm) were blended 6 parts by weight of polyethylene oxide as the water-soluble polymer, 3 parts by weight of polyethylene as the water-insoluble polymer, and 2 parts by weight of the plasticizer and lubricant. The mixture was kneaded and injection molded in the same condition as in Example 12 to obtain molded parts having the same size and shape as those obtained in [b] and [c] of Example 12.

Next, the resulting molded parts were extracted for 3 hours using the apparatus shown in FIG. 12 under the conditions of a water flow rate of 3 liter/minute. As partly shown in FIG. 13, the degree of extraction was 86% for [b] and 74% for [c]. Then, the molded parts were debinded by heating in the same condition as in Example 13 after drying them under vacuum, with the result that none of the molded parts had defects.

Thereafter, the debinded bodies thus-treated were sintered at 1,350° C. for 2 hours, and their sintered density was determined to be 7.65 g/cm³ for [b] and 7.61 g/cm³ for [c], which confirmed that they had high sintered density.

EXAMPLE 14

With 100 parts by weight of partially stabilized zirconia containing 3 mol % of $Y_2O_3$ and having a mean particle size of 0.64 μm and a specific surface area of 6.80 m²/g were blended 8 parts by weight of polyethylene oxide, and 2 parts by weight of polyethylene glycol as the water soluble polymer, 6 parts by weight of polyethylene as the water-insoluble polymer, and 2 parts by weight of stearic acid, and the resulting mixture was kneaded at 150° C. for 45 minutes using a kneader. The thus-obtained kneaded mixture was pulverized and injection molded using a screw-type injection molding machine under the conditions of an injection temperature of 165° C. and an injection pressure of 950 kg/cm² to obtain molded parts in the form of square bars having the same size and shape as those in Example 12.

Next, the resulting molded parts were extracted for 4 hours under the same conditions as in Example 13. The degree of extraction was 90% for [a], 65% for [b] and 55% for [c].

Then, the temperature of the molded parts after drying under vacuum was elevated from room temperature to 100° C. in 0.5 hour and from 100° C. to 400° C. in 6 hours, and retained at 400° C. for 0.5 hour. Upon examination of the resulting debinded products, it revealed that they had a degree of debinding of from 95% to 97%, and they had no defect. The total time required for the removal of the binder was 14 hours, which was shortened considerably as compared with that of the conventional method.

The debinded products were sintered at 1,450° C. for 4 hours in an open air atmosphere, and the density of the sintered bodies was determined to be not less than 6.00 g/cm³. The sintered bodies obtained had no defect.

What is claimed is:

1. A process for manufacturing a sintered body comprising
    mixing a powder and an organic binder which comprises at least one water-soluble thermoplastic organic polymer and at least one water-insoluble thermoplastic organic polymer to form a mixture,
    plastic molding the mixture to obtain a plastic molded part, and
    debinding said plastic molded part by bringing it in contact with water to extract and remove said water-soluble thermoplastic organic polymer, and sintering the plastic molded part after said debinding.

2. A process for manufacturing a sintered body as claimed in claim 1, further comprising removing the remainder of the organic binder by heating it in a heating furnace after said bringing in contact with water of said water-soluble thermoplastic organic polymer.

3. A process as claimed in claim 1, wherein said removal of the remainder of said organic binder by heating is performed in said heating furnace in said debinding treatment at atmospheric pressure or under reduced pressure.

4. A process as claimed in claim 1, wherein said water-soluble thermoplastic organic polymer is at least one compound selected from the group consisting of polyethylene oxide, polyethylene glycol, carboxymethylcellulose, polyacrylamide, polyvinyl ether, polyacrylic acid, and polymethacrylic acid.

5. A process as claimed in claim 1, wherein said organic binder comprises 60 to 90% by weight of said polyethylene oxide, 5 to 38% by weight of said water-insoluble thermoplastic organic polymer, and 2 to 35% by weight of said lubricant and/or plasticizer.

6. A process as claimed in claim 1, wherein the amount of said organic binder in said molded part is from 40 to 60% by volume of based on the total volume of said molded part.

7. A process as claimed in claim 5, wherein said polyethylene oxide has a molecular weight of from 50,000 to 5,000,000.

8. A process as claimed in claim 1, wherein said water-insoluble thermoplastic organic polymer is at least one compound selected from the group consisting of polystyrene, polyethylene, atactic polypropylene, and ethylene/vinyl acetate copolymers.

9. A process as claimed in claim 1, wherein said contact between said plastic molded part and water is performed by dipping said plastic molded part in water.

10. A process as claimed in claim 1, wherein said water brought in contact with said plastic molded part is caused to flow to rapidly extract said water-soluble thermoplastic polymer.

11. A process as claimed in claim 2, wherein said water-soluble thermoplastic organic polymer is at least one compound selected from the group consisting of polyethylene oxide, polyethylene glycol, carboxymethylcellulose, polyacrylamide, polyvinyl ether, polyacrylic acid, and polymethacrylic acid.

12. A process as claimed in any one of claim 2, wherein said organic binder comprises 60 to 90% by weight of said polyethylene oxide, 5 to 38% by weight of said water-insoluble thermoplastic organic polymer, and 2 to 35% by weight of said lubricant and/or plasticizer.

13. A process as claimed in claim 2, wherein the amount of said organic binder in said molded part is from 40 to 60% by volume of based on the total volume of said molded part.

14. A process as claimed in claim 12, wherein said polyethylene oxide has a molecular weight of from 50,000 to 5,000,000.

15. A process as claimed in claim 12, wherein said water-insoluble thermoplastic organic polymer is at least one compound selected from the group consisting of polystyrene, polyethylene, atactic polypropylene, and ethylene/vinyl acetate copolymers.

16. A process as claimed in claim 2, wherein said contact between said plastic molded part and water is performed by dipping said plastic molded part in water.

17. A process as claimed in claim 2, wherein said water brought in contact with said plastic molded part is caused to flow to rapidly extract said water-soluble thermoplastic polymer.

18. A process as claimed in claim 14, wherein said water brought in contact with said plastic molded part is caused to flow using a stirrer.

19. A process as claimed in claim 14, wherein said water brought in contact with said plastic molded part is caused to flow using a water supply pump.

20. A process as claimed in claim 14, wherein said water brought in contact with said plastic molded part is caused to flow using supersonic wave.

21. A process as claimed in claim 2, wherein in said debinding treatment, at least a portion of said water brought in contact with said molded part is discharged to the outside of the system, while supplying into the system water containing no water-soluble thermoplastic polymer or water containing the water-soluble thermoplastic polymer in a concentration lower than the water in contact with said molded part.

22. A process as claimed in claim 21 wherein after removing said water-soluble thermoplastic polymer from said water discharged to the outside the system, the thus-treated water is recycled to the system.

23. A process as claimed in claim 21, wherein said water containing no water-soluble thermoplastic polymer or said water containing the water-soluble thermoplastic polymer in a concentration lower than the water in contact with said molded part is sprayed onto said molded part.

24. A process as claimed in claim 22, wherein said water containing no water-soluble thermoplastic polymer or said water containing the water-soluble thermoplastic polymer in a concentration lower than the water in contact with said molded part is sprayed onto said molded part.

25. A process as claimed in claim 4, wherein said water-insoluble thermoplastic organic polymer is at least one compound selected from the group consisting of polystyrene, polyethylene, atactic polyproplyene, and ethylene/vinyl acetate copolymers.

26. A process as claimed in claim 11, wherein said water-insoluble thermoplastic organic polymer is at least one compound selected from the group consisting of polystyrene, polyethylene, atactic polyproplyene, and ethylene/vinyl acetate copolymers.

* * * * *